United States Patent

Wu et al.

[11] Patent Number: 5,692,974
[45] Date of Patent: Dec. 2, 1997

[54] GOLF BALL COVERS

[75] Inventors: Shenshen Wu, North Dartmouth; Murali Rajagopalan, South Dartmouth, both of Mass.

[73] Assignee: Acushnet Company, Fairhaven, Mass.

[21] Appl. No.: 482,519

[22] Filed: Jun. 7, 1995

[51] Int. Cl.$^6$ ............................ A63B 37/06; A63B 37/12
[52] U.S. Cl. ...................... 473/377; 473/378; 428/423.1; 428/423.9; 273/DIG. 22; 156/145; 156/146
[58] Field of Search ..................... 273/58 A, 62, 273/233, DIG. 22; 428/423.1, 423.9; 473/377, 378; 156/145, 146

[56] References Cited

U.S. PATENT DOCUMENTS 4,674,751  6/1987  Molitor et al. ..................... 273/53 R Primary Examiner—D. S. Nakarani
Attorney, Agent, or Firm—Pennie & Edmonds

[57] ABSTRACT

This invention relates to methods of using cationic ionomers in golf ball cover compositions. Further, this invention relates to golf balls which have covers and cores and which incorporate urethane ionomers. The polyurethane golf ball cover has improved resiliency and initial velocity through the addition of an alkylating agent such as t-butyl chloride to introduce ionic interactions in the polyurethane and thereby produce cationic type ionomers.

16 Claims, No Drawings

GOLF BALL COVERS

BACKGROUND OF THE INVENTION

1. Field of the Invention

This invention relates to methods of using cationic ionomers in golf ball cover compositions. Further, this invention relates to a method of improving the resiliency in polyurethane, polyurea and copolymers thereof based golf ball covers through the use of alkylating agents, i.e. quaternizing agents such as t-butyl chloride to introduce ionic interactions into the nitrogen containing polymers and/or compounds.

2. Description of the Prior Art

The United States Golf Association has implemented a series of rules regarding the physical characteristics and performance properties of golf balls to create a uniform system of play. These rules include provisions specifying that: (a) the weight of a ball shall not be greater than 1.620 ounces (45.93 gm); (b) the diameter of a ball shall be not less than 1.680 inches (42.67 mm); (c) the velocity of the ball shall not be greater than 250 feet (76.2 m) per second plus a tolerance of 2%; (d) the overall distance that a golf ball will travel shall not cover an average distance in carry and roll exceeding 280 yards plus a tolerance of 6%. With these specifications in mind, golf ball manufacturers seek to produce golf balls having an ideal balance of properties such as initial velocity, distance, "click and feel", spin, moment of inertia, loft, cut resistance and shear resistance wherein each of these properties is highly dependant on the skill level of the golfer using the ball.

Until about 1968 most golf ball covers were made of either a naturally occurring rubber called balata or gutta percha, a packing material traditionally used for transporting cargo. Balata was the preferred material as it is a soft material that can give a golf ball the potential for high spin and controllability. However, balata is a difficult material from which to manufacture golf ball covers. Further, many unskilled golfers experience difficulty in playing a balata ball because it is a high spinning ball which can readily result in a "hook" and/or "slice" unless skillfully stroked.

In 1968 DuPont introduced a class of ethylene-methacrylic acid based ionomers under the trade name SURLYN. These ionomers made it possible to produce golf balls having various ranges of properties such as spin, coefficient of restitution, cut resistance and initial velocity that were previously not possible using Balata covered golf balls. More than sixty percent of golf balls currently marketed use SURLYN in their covers. However, SURLYN balls often lack a "click and feel" which is preferred to many golf professionals.

Polyurethane, on the other hand, has been recognized as a useful material for golf ball covers since as early as about 1960. U.S. Pat. No. 3,147,324, filed Oct. 20, 1960, is directed to a method of making a golf ball having a polyurethane cover. This patent disclosed an improved method of covering a golf ball with a liquid urethane polymer which could be applied, set and cured at room temperature or at a temperature that would not damage the tensioned windings of the golf ball center. The curing agents disclosed were diamines, polyols or air moisture. Polyurethane covered golf balls were durable and did not cut as balata balls did while at the same time maintaining the "click" and "feel" of a balata ball.

In the ensuing years following 1960, various companies investigated the usefulness of polyurethane as a golf ball cover material in limited ways. U.S. Pat. No. 4,123,061 issued Oct. 31, 1978 teaches that a golf ball can be made from a polyurethane prepolymer of polyether and a curing agent, such as a trifunctional polyol, a tetrafunctional polyol or a diamine. The first commercially successful polyurethane covered golf ball appeared on the market with the introduction of Titleist's PROFESSIONAL golf ball in 1993. The principal reason for the delay in bringing polyurethane composition golf ball covers on the market was that it was a daunting engineering task to apply a coating of polyurethane composition to a golf ball core to form a golf ball cover having a uniform thickness.

In particular, the difficulty resided in centering a golf ball core in an amount of polyurethane that was sufficiently cured to keep the core centered while at the same time being insufficiently cured so that the cover material could be molded around the core. This problem was essentially solved and a commercially successful polyurethane covered golf ball appeared on the market with the introduction of the aforesaid PROFESSIONAL polyurethane covered golf ball in 1993.

Unlike SURLYN golf balls, polyurethane golf balls do possess the good "click and feel" of balata golf balls. However, golf ball covers made from polyurethane have not up to the present, fully matched SURLYN golf balls in respect of resilience or the rebound or damping behavior of the golf ball cover which is a function of the initial velocity of a golf ball after impact with a golf club. Accordingly, the present invention is directed to a golf ball having a urethane ionomer cover and a core which has improved resilience and increased initial velocity and a method of producing urethane inonomer covers.

SUMMARY OF THE INVENTION

The present invention is directed to a new cover material for use in golf balls that offers improved properties over prior art cover materials.

Also, the present invention is directed to cover materials which can be easier to use in manufacturing golf balls.

Further, the present invention is directed to a golf ball having a cover and a core wherein the cover comprises a positively charged organic ionomer.

In addition, the present invention is directed to a golf ball having a cover and a core wherein the cover comprises a quaternary ammonium ionomer.

Still further, the present invention is directed to a golf ball having a core and a cover wherein the cover comprises a quaternary ammonium ionomer in the form of a urethane ionomer, and copolymers thereof.

The present invention is also directed to novel methods of using positively charged ionomers, quaternary ammonium ionomers and urethane ionomers in golf ball covers.

DETAILED DESCRIPTION OF THE INVENTION

For purposes of the present invention an ionomer is an organic compound having one or more sites that have a positive or negative charge. An ionomer according to the claimed invention may be a compound having a single ionic site or a polymer having a plurality of ionic sites.

Quaternary ammonium compounds are well known in the art of organic chemistry. They are compounds having a tertiary nitrogen group having a positive charge. In general quaternary ammonium compounds have a structure according to formula I;

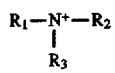

Formula I

The synthesis of quaternary ammonium compounds is well known and is described in such well known organic chemistry text books as "Organic Chemistry" by Hendrickson, Cram and Hammond, third edition, McGraw-Hill, and "Introduction To Organic Chemistry" by Streitwieser and Heathcock, second edition, Macmillan Publishing Co., Inc., the relevant portions of which are herein incorporated by reference.

Cationic ionomers are also well known to the person of ordinary skill in the art. In particular, cationic ionomers have a structure according to formula II:

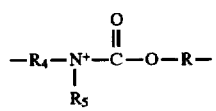

Formula II or formula III

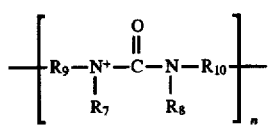

Formula III

Wherein $R_1$, $R_2$, $R_3$, $R_4$, $R_5$, $R_6$, $R_7$, and $R_8$, are organic moieties selected from the group consisting of linear or branched chain alkyl, carbocyclic or aryl.

As used herein, the phrase linear chain or branched chained alkyl groups of up to about 30 carbon atoms means any substituted or unsubstituted acyclic carbon-containing compounds, including alkanes, alkenes and alkynes. Examples of alkyl groups include lower alkyl, for example, methyl, ethyl, n-propyl, iso-propyl, n-butyl, iso-butyl or tert-butyl; upper alkyl, for example, octyl, nonyl, decyl, and the like; and lower alkylene, for example, ethylene, propylene, propyldiene, butylene, butyldiene, and the like. The ordinary skilled artisan is familiar with numerous linear and branched alkyl groups, which are within the scope of the present invention.

In addition, such alkyl group may also contain various substituents in which one or more hydrogen atoms has been replaced by a functional group. Functional groups include but are not limited to hydroxyl, amino, carboxyl, amide, ester, ether, sulfonic, siloxane, siloxam, sulfonyl, and halogen (fluorine, chlorine, bromine and iodine), to mention but a few.

As used herein, substituted and unsubstituted carbocyclic groups of up to about 20 carbon atoms means cyclic carbon-containing compounds, including but not limited to cyclopentyl, cyclohexyl, cycloheptyl, admantyl, and the like. Such cyclic groups may also contain various substituents in which one or more hydrogen atoms has been replaced by a functional group. Such functional groups include those described above, and lower alkyl groups as described above. The cyclic groups of the invention may further comprise a heteroatom.

As used herein, substituted and unsubstituted aryl groups means a hydrocarbon ring bearing a system of conjugated double bonds, usually comprising six or more even number of π (pi) electrons. Examples of aryl groups include, but are not limited to, phenyl, naphthyl, anisyl, toluyl, xylenyl and the like. According to the present invention, aryl also includes heteroaryl groups, e.g., pyrimidine or thiophene. These aryl groups may also be substituted with any number of a variety of functional groups. In addition to the functional groups described above in connection with substituted alkyl groups and carbocyclic groups, functional groups on the aryl groups can be nitro groups.

As mentioned above, R can also represent any combination of alkyl, carbocyclic or aryl groups, for example, 1-cyclohexylpropyl, benzyl cyclohexylmethyl, 2-cyclohexylpropyl, 2,2-methylcyclohexylpropyl, 2,2-methylphenylpropyl, 2,2-methylphyenylbutyl.

Urethane ionomers are most commonly produced by reacting a urethane with an alkylating agent. Urethanes can be produced according to any technique known to the chemist of ordinary skill in the art. These methods can include for example, coreacting polysocyanates with a diol or a polyol. Linear polyurethanes can be obtained from difunctional reactants while branched polyurethanes can be made from a combination of difunctional and higher functional reactants Polyurethane results from the reaction between a polyurethane prepolymer and a curing agent. The polyurethane prepolymer can be the product of a reaction between a polyol and a polysocyanate. Curing agents such as polymines functional, glycols and diols can be used to cure polyurethane. A catalyst can be employed to promote the reaction between the curing agent and the polyurethane prepolymer.

Conventionally, there are two categories of polyurethane on the market, thermoset and thermoplastic. Thermoplastic polyurethanes are made from a polyisocyanate, such as 4,4'-biphenylmethane diisocyanate (MDI) or 3,3'-dimethyl-4,4'-biphenylene diisocyanate (TODI), and a polyol cured with a diol, such as 1,4-butanediol. Thermoset polyurethanes are made from a polyisocyanate, such as 2,4-toluene diisocyanate (TDI) or methylenebis-(4-cyclohexyl isocyanate) (HMDI), and a polyol which is cured with a polyamine, such as methylenedianiline (MDA), or a trifunctional glycol, such as trimethylol propane, or tetrafunctional glycol, such as N,N,N',N'-tetrakis(2-hydroxypropyl) ethylenediamine.

Suitable polyether polyols include polytetramethylene ether glycol; poly(oxypropylene) glycol; and polybutadiene glycol. Suitable polyester polyols include polyethylene adipate glycol; polyethylene propylene adipate glycol; and polybutylene adipate glycol. Suitable polylactone polyols include diethylene glycol initiated caprolactone; 1,4-butanediol initiated caprolactone; trimethylol propane initiated caprolactone; and neopentyl glycol initiated caprolactone. The preferred polyols are polytetramethylene ether glycol; polyethylene adipate glycol; polybutylene adipate glycol; and diethylene glycol initiated caprolactone.

Suitable curatives for use in the present invention are selected from the slow-reacting polyamine group consisting of 3,5-dimethylthio-2,4-toluenediamine; 3,5-dimethylthio-2,6-toluenediamine; N,N'-dialkyldiamino diphenyl methane; trimethylene-glycol-di-p-aminobenzoate;; polytetramethyleneoxide-di-p-aminobenzoate; or a difunctional glycol; and mixtures thereof. 3,5-dimethylthio-2,4-toluenediamine and 3,5-dimethylthio-2,6-toluenediamine are isomers and are sold under the trade name ETHACURE® 300 by Ethyl Corporation. Trimethylene glycol-di-p-aminobenzoate is sold under the trade name POLACURE 740M and polytetramethyleneoxide-di-p-aminobenzoates are sold under the trade name POLAMINES by Polaroid Corporation. N,N'-dialkyldiamino diphenyl methane is sold under the trade name UNILINK® by UOP. A preferred glycol is PTMEG, poly(tetramethylene ether) glycol.

Suitable bifunctional glycols are 1,4-butanediol; 1,3-butanediol; 2,3-butanediol; 2,3-dimethyl-2,3-butanediol;

dipropylene glycol; and ethylene glycol. Difunctional glycols are inherently slow-reacting.

Accordingly, urethanes can be made from any of numerous commercially available aromatic, aliphatic and cycloaliphatic diisocyanates and polyisocyanates.

Urethane ionomers are commonly produced by reacting a urethane with a alkylating and/or a quaternizing agent according to processes known to the person of ordinary skill in the art. Alkylating and/or quaternizing agents suitable for use in the present invention include alkyl and/or aromatic halides, such as 1-iodohexane, and preferably alkyl chlorides such as t-butyl chloride, dialkyl sulfates such as dimethyl sulfate and diethyl sulfate. Some strong acids are also suitable as alkylating and/or quarternizing agents. These acids include glacial acetic acid.

Preferably, a golf ball is made in accordance with the present invention by molding a cover about a core wherein the cover is formed from a polyurethane composition comprising a polyurethane prepolymer and a slow-reacting polyamine curing agent or a bifunctional glycol.

It has also been found useful to add an amount of pigment and/or violet agent to the cover composition which is effective to provide a color to the cover material which approximates the color of any paint or other coating added to the golf ball. Suitable violet agents include PV Fast Violet RL Special and Hostapern Violet RL Extra Strong sold by Hoechst Celanese Corporation; and Violet 23 sold by Sun Chemical Corporation. The amount of violet agent added to the cover composition is preferably about 0.0005% to about 0.002% based on total weight of cover stock. Good results have been obtained with about 0.001% by weight. Preferably, about 3.5% of the white pigment by weight of the total cover composition is used in the cover stock of the present invention.

Ultra marine blue pigments may also be used in the golf ball covers according to the present invention. Preferably the amount of ultra marine blue pigment used will be from about 0.01% to about 1.0 % or more preferably from about 0.4% to about 0.8%.

Suitable white pigments include titanium dioxide, calcium carbonate, zinc oxide and zinc sulfide. These white pigments may be used in any amount which is suitable to provide a uniform white color of the desired brightness to the golf ball covers of the present invention. In particular, these white pigments may be used in amounts of from about 0.001% to about 5.0%. The more preferred range of white pigment is from about 2% to about 4%.

Additional components which can be added to the cover composition include U.V. stabilizers, antioxidants, filters, glass spheres, fibers etc. such as Tinuvin 213 and Tinuvin 328. Also, light stabilizers such as Tinuvin 770 and Tinuvin 765, may also be used. Furthermore, any combination of U.V. stabilizers and light stabilizers can also be used. Other dyes, as well as optical brighteners and fluorescent pigments and dyes may also be used in the golf ball covers according to the present invention. Such additional ingredients may be used in any amounts that will achieve their desired purpose. However conventional amounts include the range of from about 0.05% to about 1.5% or more preferably, from about 0.5% to about 1.0%.

With ionomers made in accordance with the present invention, the degree of cure which has taken place is dependent upon, inter alia, time, temperature, type of curative, and amount of catalyst used. It has been found that the degree of cure of the cover composition is directly proportional to the hardness of the composition. A hardness of about 10 D to 30 D, Shore D hardness for the cover stock at the end of the intermediate curing step (i.e., just prior to the final molding step) has been found to be suitable for the present invention. More preferred is a hardness of about 12 D to 20 D.

Unless otherwise specified the Shore D hardness is suitably measured with a Shore D Durometer made by Shore Instrument and Mfg. Co., Inc. The measurement is made in accordance with ASTM D 2240, "Indentation Hardness of Rubber and Plastic by Means of a Durometer." This test is performed on a 0.25 inch (6 mm) thick test plaque which has been molded for 5.5 minutes at 140° F. (60° C.) in a test slab mold. The hardness of the plaque is measured after 5.5 minutes and at one-minute intervals thereafter up to a total of 30 minutes. The length of time for the intermediate curing step can be determined when the cover stock reaches a hardness between 10 D to 30 D as measured by the durometer hardness measurement technique. This length of time is suitably found to be 5 to 30 minutes.

The dimpled golf ball product from the final molding step can be subjected to standard golf ball finishing operations such as buffing, painting, nameplating and packaging according to techniques and practices well known in the art.

Golf ball using a cover material according to the present invention may be used in any type of golf ball having any type of construction such as those mentioned for example.

EXAMPLES

In order to exemplify the results achieved using the urethane ionomer golf ball covers of the present invention, the following examples are provided without any intent to limit the scope of the instant invention to the discussion therein, all parts and percentages are by weight unless otherwise indicated.

Example 1

1 equivalent of VIBRATHANE CFM-3-149, a urethane prepolymer, 0.7 equivalents of 1,4-butanediol, 0.3 equivalents of polamine 650 and 3.5% of HCC-15181 Dispersion are vacuum degassed in a vacuum oven maintained at 140° for one half hour. Then the 3.5% of the dispersion is added to the prepolymer beaker. Then the prepolymer and the color dispersion mixture and 0.7 equivalents of 1,4-butanediol are mixed in the same beaker for 15 seconds. 0.3 equivalents of polamine 650 are added and the entire composition is mixed for 15 seconds. Either no alkylating and/or quarternizing 0.1 or 0.5 equivalents (formulation 2) of t-butyl chloride are added and the contents of the beaker are mixed for 30 seconds. A summary of the ingredients of the various formulations according to this example appears in table I.

TABLE I

| Material | Control Formulation | Formulation 1 | Formulation 2 |
|---|---|---|---|
| Vibrathane CFM-3-149 | 1 Eq | 1 Eq | 1 Eq |
| 1,4-BDO | .7 Eq | .7 Eq | .7 Eq |
| Polamine 650 | .3 Eq | .3 Eq | .3 Eq |
| t-Butyl Chloride | — | .1 Eq | .5 Eq |
| Color Dispersion | 3.5% | 3.5% | 3.5% |

The mixture made according to the control, formulation 1 or formulation 2 is then added to male and female mold halves. At gel, a 1.580 inch wound core is placed into a male mold maintained at approximately 170° F. which is then immediately mated with the female mold half which is maintained at about 170° F. The assembled mold was clamped in into a 4-mold clamping fixture and allowed to cure at ambient conditions for one hour. The molded balls are then removed from the mold and their physical properties are tested. A summary of some of the physical properties are summarized below in table 2.

TABLE 2

PHYSICAL PROPERTIES

| Property | Control Formulation | Formulation 1 | Formulation 2 |
|---|---|---|---|
| Velocity | 254.52 ft/sec | 254.97 ft/sec | 255.76 ft/sec |
| Shore D | 47 | 44 | 43 |

Wound core: 1.580" UB

Example 2

1 equivalent of VIBRATHANE CFM-4-47, a urethane prepolymer, 0.8 equivalents of 1,4-butanediol, 0.2 equivalents of DER-331 and 3.5% of HCC-15181 Dispersion are vacuum degassed in a vacuum oven maintained at 140° for one half hour. Then the 3.5% of the dispersion is added to the prepolymer. Then the prepolymer and the color dispersion mixture of 0.8 equivalents of 1,4-butanediol are mixed in the same beaker for 15 seconds. 0.2 equivalents of DER-331 are added and the entire composition is mixed for 15 seconds. Either no (control formulation 3) or 0.2 (formulation 3) of t-butyl chloride are added and the contents of the beaker are mixed for 30 seconds. A summary of the ingredients of the various formulations according to this example appears in table III.

TABLE III

| Material | Control Formulation 1 | Formulation 3 |
|---|---|---|
| Vibrathane CFM-4-47 | 1 Eq | 1 Eq |
| 1,4-BDO | 0.8 Eq | 0.8 Eq |
| DER-331 | 0.2 Eq | 0.2 Eq |
| t-Butyl chloride | — | 0.2 Eq |
| Color Dispersion | 3.5% | 3.5% |

The mixture made according to control formulation 1 or formulation 3 is then added to male and female mold halves. At gel 3, a 1.580 inch wound core is placed into a male mold maintained at approximately 170° F. which is then immediately mated with the female mold half which is maintained at about 170° F. The assembled mold was clamped in into a 4-mold clamping fixture and allowed to cure at ambient conditions for one hour. The molded balls are then removed from the mold and their physical properties are tested. A summary of some of the physical properties are summarized below in table IV.

TABLE IV

PHYSICAL PROPERTIES

| Property | Control Formulation 2 | Formulation 3 |
|---|---|---|
| Velocity | 253.53 ft/sec | 254.60 ft/sec |
| Shore D | 51 | 51 |

Wound core: 1.580" UB

The scope of the following claims is intended to encompass all obvious changes in the details, materials, and arrangement of parts that will occur to one of ordinary skill in the art:

We claim:

1. A golf ball having a cover and a core wherein the cover comprises a cationic polymer having cation groups on the polymer.

2. A golf ball according to claim 1 wherein the cationic polymer comprises a cationic quaternary ammonium polymeric ionomer.

3. A golf ball according to claim 2 wherein the quaternary ammonium ionomer is a cationic polyurethane.

4. A golf ball according to claim 3 wherein the cationic polyurethane ionomer comprises a reaction product of a quaternizing agent and a polyurethane.

5. A golf ball according to claim 4 wherein the quarternizing agent is t-butyl chloride.

6. The golf ball of claim 1, wherein said cationic ionomer is a cationic polyurea ionomer.

7. A golf ball having a cover and a core wherein the cover comprises a thermoplastic cationic polyurethane ionomer.

8. A golf ball having a cover and a core wherein the cover comprises a thermoset cationic polyurethane ionomer.

9. A method for making a golf ball comprising a cover and a core comprising the steps of:

(a) providing a core;

(b) covering said core with a material which comprises a cationic polymer having cation groups on the polymer.

10. A method according to claim 9 wherein the cationic polymer is a cationic quaternary ammonium polymeric ionomer.

11. A method according to claim 10 wherein the quaternary ammonium polymeric ionomer is a cationic polyurethane ionomer.

12. A method according to claim 11 wherein the cationic polyurethane ionomer is formed by reacting a quaternizing agent and the reaction product of 4,4-diphenylmethane diisocyanate and poly(tetra-methylene ether) glycol.

13. The method according to claim 11, wherein the cationic polyurethane ionomer is formed from the reaction product of a quaternizing agent and polyurethane.

14. The method of claim 9 wherein said cationic polymer is a cationic polyurea ionomer.

15. The method of claim 9, wherein said cationic polymer is a thermoplastic cationic polyurethane ionomer.

16. The method of claim 9, wherein said cationic polymer is a thermoset cationic polyurethane ionomer.

* * * * *

UNITED STATES PATENT AND TRADEMARK OFFICE
CERTIFICATE OF CORRECTION

PATENT NO. : 5,692,974

DATED : December 2, 1997

INVENTOR(S) : Shenshen Wu and Murali Rajagopalan

It is certified that error appears in the above-identified patent and that said Letters Patent is hereby corrected as shown below:

In claim 9, line 1, change "golf bail" to --golf ball--.

Signed and Sealed this

Fifteenth Day of June, 1999

Q. TODD DICKINSON

*Attest:*

*Attesting Officer*      Acting Commissioner of Patents and Trademarks